J. J. JARDINE.
Blind-Slat Retainer.
No. 224,918.  Patented Feb. 24, 1880.
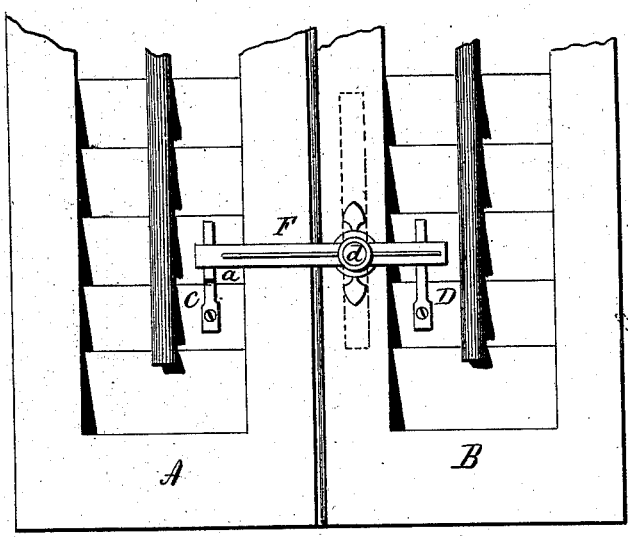
James J. Jardine,
Inventor

UNITED STATES PATENT OFFICE.

JAMES J. JARDINE, OF NEW HAVEN, CONNECTICUT.

BLIND-SLAT RETAINER.

SPECIFICATION forming part of Letters Patent No. 224,918, dated February 24, 1880.

Application filed December 26, 1879.

*To all whom it may concern:*

Be it known that I, JAS. J. JARDINE, of New Haven, in the county of New Haven and State of Connecticut, have invented a new Improvement in Window-Blind Fasteners; and I do hereby declare the following, when taken in connection with the accompanying drawings and the letters of reference marked thereon, to be a full, clear, and exact description of the same, and which said drawings constitute part of this specification, and represent, in—

Figure 1, inside view of the two parts with fastener applied; Fig. 2, vertical section of one part; Fig. 3, vertical section of the other part.

This invention relates to a device to secure window-blinds in their closed position, and at the same time to close and secure the rolling slats; and the invention consists in the construction hereinafter described, and particularly recited in the claim.

A represents one part, and B the other part, of a pair of common rolling slat-blinds. On one slat of one part an arm, C, is secured by one end, and extends upward so that the other end will bear upon the next slat, or some other slat than the one to which the arm is attached, as seen in Fig. 2. On this arm is a shoulder, *a*, for the purpose hereinafter described. From the shoulder *a* the arm is inclined toward the slat upon which it bears. On the other part a similar arm, D, is attached to a corresponding slat, and in like manner extends and so as to bear upon another slat with an incline, E, the reverse of the incline on the other arm.

On one of the parts A or B a bar, F, is pivoted at *d*, so as to swing in a vertical plane parallel with the plane of the blind, and so that one end will turn onto the incline of one of the arms and the other end onto the incline of the other arm, as seen in Fig. 1, or it may be turned into vertical position, as seen in broken lines. When in the said vertical position the parts are free to be opened and the slats are free to be turned, as seen in broken lines, Figs. 2 and 3; but when the blinds are closed and the slats turned to their closed position, as seen in Figs. 2 and 3, then the bar may be turned, one end passing onto the incline E of one arm and the other end onto the incline of the other arm, and so as to rest upon the shoulder *a*, as seen in Fig. 1. The movement of the bar onto the respective arms presses them hard upon the slats, and so that it is impossible to turn them from the outside; hence the act of securing the two parts of the blind also secures the slats.

I claim—

The combination of the arm C upon the slats of one part of the blind and the arm D upon the slats of the other part with the pivoted bar F, substantially as and for the purpose described.

JAMES J. JARDINE.

Witnesses:
 JOS. C. EARLE,
 J. H. SHUMWAY.